July 25, 1939.  W. SCHMIDT  2,167,409
AUTOMATIC DOOR CHECK WITH TENSION CONTRIVANCE AND MECHANICAL BRAKE
Filed June 9, 1938
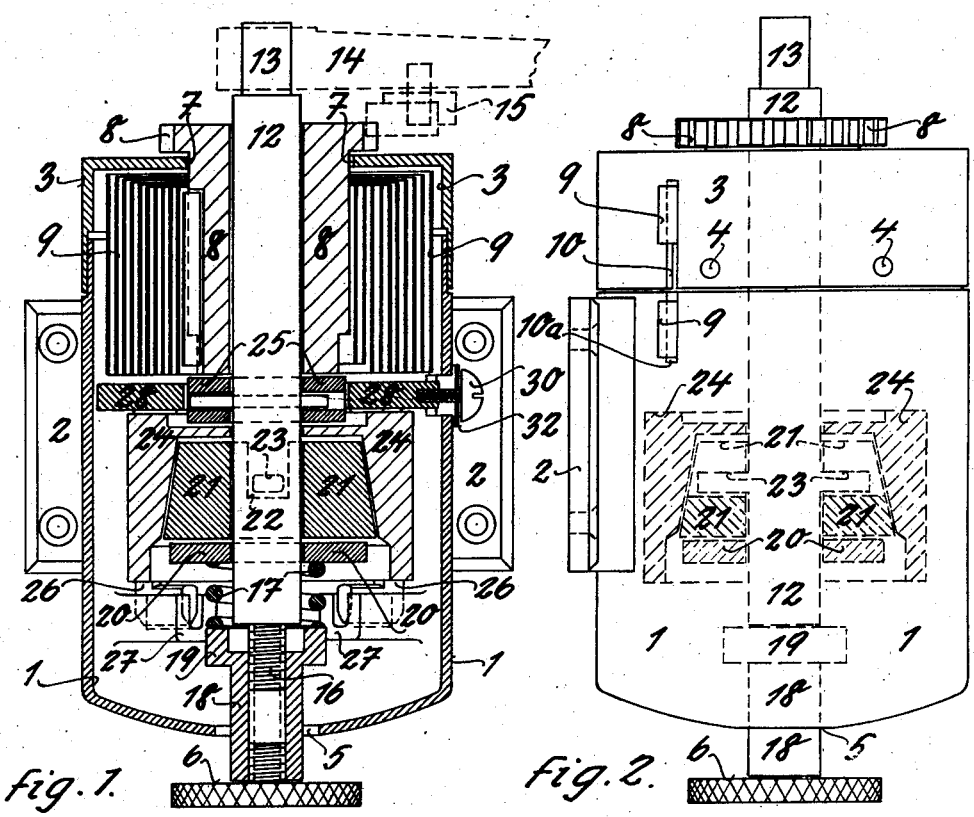
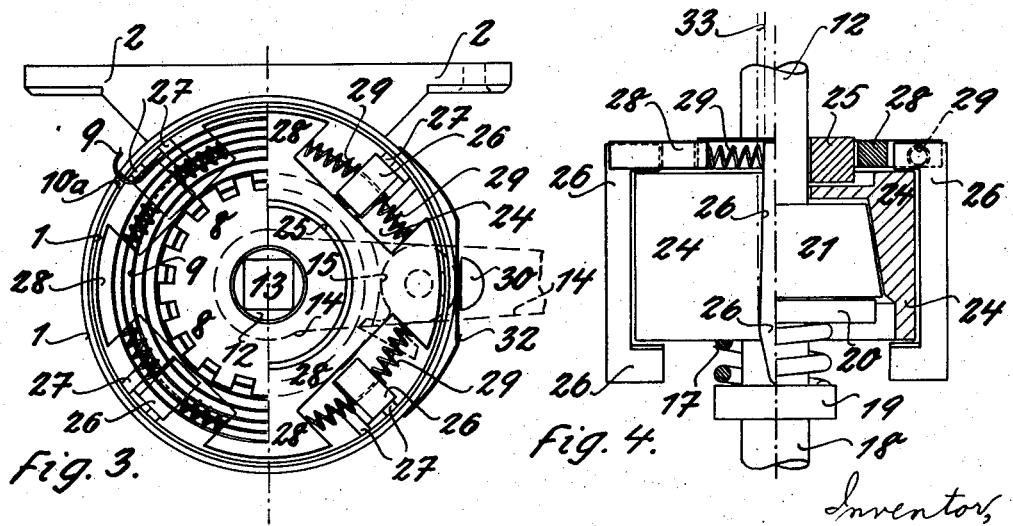
Inventor,
Walter Schmidt,
by Frank S. Appleman,
Attorney.

Patented July 25, 1939

2,167,409

UNITED STATES PATENT OFFICE 2,167,409

AUTOMATIC DOOR CHECK WITH TENSION CONTRIVANCE AND MECHANICAL BRAKE

Walter Schmidt, Menden, Iserlohn, Germany

Application June 9, 1938, Serial No. 212,786
In Germany July 10, 1937

8 Claims. (Cl. 16—49)

Door checks with tension contrivance and mechanical brake are known, also those in which the mechanical braking device can be used for different turning directions. Furthermore it has already been proposed to use a brake drum for the mechanical braking device.

Compared with this known state of the art the present invention consists in the braking part being permanently and uniformly engaged with the braked parts, so that the end play is avoided and the braking effect is always the same. Furthermore in this invention an adjusting contrivance acts on a cone, the friction or braking effect of which can be adjusted to various degrees. According to another construction of this invention the braking effect is obtained with the help of a brake drum, the braking of which is effected, according to the turning direction, by the use of tiltable fixing contrivances in the form of U-shaped grippers.

By these features of the invention, as already mentioned, the end play is avoided; thus the door closes a certain distance before the brake enters into play. That is because, contrary to the contrivances hitherto known, no play is left between the brake and the part to be braked, so that the brake engages immediately and has not, as in the case of the known contrivances, first to overcome this play, which gives rise to the so-called end play.

In that form of construction described in the following, this effect is obtained by the inclined position of grippers, which is always present, whereby the grippers are always engaged with the casing; also the braking cone is always engaged with the casing, so that braking always commences immediately; moreover by the conical shape of the brake the wear and tear is reduced to a minimum.

On the drawing the subject of this invention is shown in one construction as an example, in which:

Fig. 1 is the complete device in longitudinal cross section,

Fig. 2 is a side elevation with certain of the parts shown in dotted lines within the device.

Fig. 3 is a section on the line 3—3 of Figure 1.

Fig. 4 is a detail view showing certain of the parts of the invention removed from the casing and with certain of the removed parts being broken away to show in section.

Fig. 1 shows the main casing part 1 with the fixing plate 2, the removable cover 3 which can be fastened down to the casing 1 with the help of the bolt-holes 4. The casing 1 has an opening 5 for the passage of the adjusting screw 6. The cover 3 has an opening 7 for the passage of the tension wheel 8 for the closing spring 9. The spring 9 is held with one end in a slot 10 of the cover 3; the other end of the spring 9 engages into a suitable fixing contrivance (e. g., a groove) of the tension wheel 8. The spring 9 can, of course, be fixed to some other part of the casing 1, e. g., in a prolongation 10a of the slot 10 shown in the casing, the only object being to hold the spring at one end firmly to a fixed part of the contrivance.

The axle 12, which is free to move independently of the tension wheel, extends through the tension wheel 8 and is provided with the square end 13. On the square end 13 is mounted, in the usual manner, one end 14 of the arm of the door check which, by means of a pawl 15, engages a toothed end on the wheel 8 so that movement of the arm 14 upon opening of the door causes winding and tensioning of the spring 9. Hinged to the other end of the arm 14 is another lever arm with a contrivance at its opposite end for fixing it to the door or the wall, adjustable by spindles in the usual way (not shown in the drawing).

The axle 12 carries a threaded extension 16 to enable a compression spring 17 to be held by a threaded sleeve 18 with adjusting flange 19 that can be screwed on to the threaded extension 16. The threaded sleeve 18 has a bore passing right through it with inside thread, in which the adjusting screw 6 is screwed. It will be noted that in assembling the device, member 18 is passed through the opening 5 from above downwardly in Fig. 1. The shaft 12 is then connected with the member 18 and the screw 6 is screwed into the outer end of said member 18, thereby assembling the parts.

The spring 17 presses against a disc 20, which revolves on the shaft 12. This disc presses in turn against the cone 21, which is held on two catches 23 by means of two grooves 22, the catches being firmly connected to the shaft 12. The cone 21 can therefore be displaced in the longitudinal direction of the shaft, but does not revolve about it, and is subjected to the pressure of the spring 17. The cone is gripped by a brake drum 24 that can revolve as desired round the shaft 12, being secured by a fixing ring 25 or by some other means against displacement on the shaft 12 beyond a certain point, namely against the pressure from above exercised by the braking cone 21 through the spring 17.

The brake drum 24 is guided by four U-shaped stirrups distributed over its circumference, these U-shaped stirrups 26 being held with one arm in the bearings 27. These bearings 27 are in firm connection with the casing 1 and may have any shape, but must be so formed as to allow the stirrups 26 a certain amount of play in the bearings to enable them to tilt slightly sideways. With their other arm the U-shaped stirrups 26 are led through a ring provided with springs in such a manner that each stirrup 26 is held in a tilted position between two springs 29 on this ring. By virtue of this tilted position the stirrup 26 will normally hold fast the brake drum 24 (see Fig. 4). Here it can be seen how the stirrup 26 is tilted to the right, i. e., in the direction opposite to the turn for the door opening, by the space 33 which is shaded.

The braking effect is suspended only when the stirrups 26 are brought into a vertical position (not tilted) or when the tilt is relieved by the brake drum turning in the direction corresponding to the direction when opening the door. When closing the door the drum 24, carried by the cone 21 firmly seated on the axle 12, remains rigid and is held fast as a consequence of the stirrups 26 being again given a tilt owing to the friction of the stirrups 26 against the drum 24, so that they now hold the drum 24 fast, and then the friction of the cone 21 within the drum 24 takes up the braking effect against the spring closing effect.

The contrivance works as follows:

When the door is opened the spring 9 is stretched by the lever arm 14 with the help 15, as is usual with door checks of this kind, till the door has been opened to the desired extent. The elastic ring 28 is held down to the casing 1 by an adjusting screw 30, which passes through a slot 31 of the casing and a cover plate 32. The adjusting screw 30 can be displaced on the casing to a certain extent right or left according to the size of the slot 31 and the tension of the ring 28, to enable the stirrups 26 to be tilted to the right or left in the position of rest, so that the door check may be used both for doors opening to the right and those opening to the left.

When the door is opened all those parts turn which are directly or indirectly connected to the axle 12, e. g., the cone 21, the brake drum 24, the axle extension 6, 18, 19, the tension wheel 8 and the square end 13, this stretches the closing spring 9.

The reason why the brake drum 24 is not braked during this process is as follows: By the elastic ring 28 the U-shaped stirrups 26 are pressed into a locking position and for the time being they hold the brake drum still. But in accordance with the initial adjustment of the contrivance the direction of the locking position of the stirrups 26 is contrary to the direction of rotation of the shaft 12 when the door is opened, i. e., with this direction of rotation the brake drum 24 tries to bring the stirrups 26 into a vertical position, into that position in which no braking effect occurs because the length of the edge does not permit it. Each stirrup is able to yield somewhat, because in the elastic ring 28 the grooves which guide the stirrup exceed to a considerable extent the width of the head of the stirrup, this extra space being filled in with springs which permit the stirrup head to yield slightly up to the stop motion surface. Thus when the door is opened the head of the stirrup (the other end of the stirrup being held in the bearing 27 in a manner enabling it to tilt) is drawn away in a manner which releases it from the tilted position brought about by the spring 29 and stops the braking effect of the brake drum 24; the latter thus moves freely with the axle 12. This continues as long as the door is being opened and the direction of rotation of the axle 12 remains unchanged. At the moment when the direction of rotation of the axle is reversed by the closing of the door, the stirrups 26 are tilted, because now, by means of friction, the reversed rotation of the brake drum 24 presses the stirrups into just that direction in which they are also tilted by the elastic ring 28, i. e., the brake drum can now no longer turn in the casing 1, but the axle 12 is still able to turn in the brake drum, together with the cone 21 that is attached to the axle 12.

The purpose of the cone 21 is to enable the closing of the door to be adjusted to different speeds with the help of the adjusting device 6, 18, 19, 20 and the pressure spring 17, since with the help of the adjustable spring pressure the friction arising between the surface of the cone and the brake drum 24 can be increased or diminished at will. If the braking effect is to be intensified, i. e., if the door is to be closed more slowly, this is done by screwing the cone 21 somewhat deeper into its seat by means of its adjusting device 6, 18, 19, 17, 20. If on the other hand the closing of the door is to be accelerated, the friction between the cone and the brake drum must be diminished and both parts given correspondingly more air between the friction surfaces by slackening the cone.

What I claim is:

1. In a door check, a casing, a tension cylinder having a bore therethrough and extending into the casing from one end thereof, a spirally coiled spring surrounding said cylinder within the casing and having its ends secured to the cylinder and casing respectively, a shaft rotatably mounted in said bore and having an end projecting through the cylinder outside the casing, an operating lever mounted on said shaft end and operatively connected to said cylinder, the other end of said shaft projecting from the cylinder within the casing, a friction clutch member rotatably mounted on the last mentioned end of the shaft, a second friction clutch member splined on the shaft and coacting with the first clutch member, means urging said clutch members into clutching relation, and means supported from the casing within the latter to hold the first clutch member against rotation in one direction and to free the clutch member for rotation in the other direction.

2. In a door check, a casing, a tension cylinder having a bore therethrough and extending into the casing from one end thereof, a spirally coiled spring surrounding said cylinder within the casing and having its ends secured to the cylinder and casing respectively, a shaft rotatably mounted in said bore and having an end projecting through the cylinder outside the casing, an operating lever mounted on said shaft end and operatively connected to said cylinder, the other end of said shaft projecting from the cylinder within the casing, a friction clutch member rotatably mounted on the last mentioned end of the shaft, a second friction clutch member splined on the shaft and coacting with the first clutch member, means urging said clutch members into clutching relation, said first clutch member having a cylindrical exterior, gripping arms spaced circumferentially about said first clutch member, means supporting said arms from said casing, and spring means biasing said arms into gripping relation with the first clutch member.

3. In a door check, a casing, a tension cylinder having a bore therethrough and extending into the casing from one end thereof, a spirally coiled spring surrounding said cylinder within the casing and having its ends secured to the cylinder and casing respectively, a shaft rotatably mounted in said bore and having an end projecting through the cylinder outside the casing, an operating lever mounted on said shaft end and operatively connected to said cylinder, the other end of said shaft projecting from the cylinder within the casing, a friction clutch member rotatably mounted on the last mentioned end of the shaft, a second friction clutch member splined on the shaft and coacting with the first clutch member, means urging said clutch members into clutching relation, said first clutch member having a cylindrical exterior, gripping arms extending longitudinally of the first clutch member and spaced therearound, said arms each having an inwardly extending finger projecting radially of one end of the first clutch member, fixed seats carried by the casing and having said fingers loosely mounted therein, a supporting ring fixed to the casing at the opposite end of the first clutch member and having peripheral slots receiving the remaining ends of the gripping arms, and biasing spring in said slots urging the arms into biased position in one direction and resisting biasing of the arms in the other drection.

4. In a door check, a shaft member, a housing member wherein said shaft extends, one of said members being fixedly mounted and the other being rotatable relative to the fixedly mounted member, a cone clutch comprising male and female members, said male member being fixed to rotate with the shaft and the female member being rotatable on the shaft, means carried by the casing for limiting rotative movement of the female member and including springs normally holding said female member against rotation, said male member being adjustable to desired frictional relation with the female member, and means for effecting adjustment of the male member.

5. In a spring biased door check, a stationary member, a second member associated therewith and rotatable relative thereto as the door is opened and closed, a clutch member including a driving and driven member carried by said rotatable member, means frictionally connecting said driving member and said driven member, at least one U-shaped stirrup tiltably carried by said stationary member, and means normally tilting said stirrup to a position to engage said driven member and prevent rotation thereof as said door is closed whereby to exert a braking influence on said driven member.

6. In a spring biased door check, a stationary member, a second member associated therewith and rotatable relative thereto as the door is opened and closed, a clutch member including a driving and driven member carried by said rotatable member, means frictionally connecting said driving member and said driving member, at least one U-shaped stirrup tiltably carried by said stationary member, and means normally tilting said stirrup to a position to engage said driven member and prevent rotation thereof as said door is closed whereby to exert a braking influence on said driven member, said position of said U-shaped member permitting free rotation of said driven member with said driving member as the door is opened.

7. The structure of claim 5, said driven member and said driving member being movable relative to each other to vary the frictional connection therebetween, spring means urging said driving and driven members into frictional engagement, and threaded means for varying the tension of said spring means.

8. The structure of claim 5, said driving member comprising a frustro-conical member, said driven member comprising a complementary drum receiving the same, and said U-shaped stirrup engaging the periphery of said drum for the purpose set forth.

WALTER SCHMIDT.